(12) United States Patent
Cazals

(10) Patent No.: US 8,128,023 B2
(45) Date of Patent: Mar. 6, 2012

(54) AIRCRAFT WITH JET ENGINES ARRANGED AT THE REAR

(75) Inventor: Olivier Cazals, Daux (FR)

(73) Assignee: Airbus Operations SAS, Toulouse (FR)

( * ) Notice: Subject to any disclaimer, the term of this patent is extended or adjusted under 35 U.S.C. 154(b) by 561 days.

(21) Appl. No.: 11/946,579

(22) Filed: Nov. 28, 2007

(65) Prior Publication Data

US 2009/0065632 A1 Mar. 12, 2009

(30) Foreign Application Priority Data

Nov. 30, 2006 (FR) ...................................... 06 55199

(51) Int. Cl.
*B64D 27/00* (2006.01)
(52) U.S. Cl. ........................................ 244/55; 244/45 R
(58) Field of Classification Search .................... 244/55, 244/45 R, 54, 58
See application file for complete search history.

(56) References Cited

U.S. PATENT DOCUMENTS

| | | | | |
|---|---|---|---|---|
| 3,447,761 A * | 6/1969 | Wadleigh et al. | ............... | 244/15 |
| 3,519,227 A * | 7/1970 | Brooks | ............... | 244/55 |
| 4,390,150 A * | 6/1983 | Whitener | ............... | 244/45 R |
| 4,767,083 A * | 8/1988 | Koenig et al. | ............... | 244/12.3 |
| 5,071,088 A * | 12/1991 | Betts | ............... | 244/12.1 |
| 5,374,010 A * | 12/1994 | Stone et al. | ............... | 244/12.5 |
| 5,899,409 A * | 5/1999 | Frediani | ............... | 244/13 |
| 6,170,780 B1 * | 1/2001 | Williams | ............... | 244/15 |
| 6,199,795 B1 * | 3/2001 | Williams | ............... | 244/15 |
| 2004/0056150 A1 * | 3/2004 | Morgenstern | ............... | 244/45 R |
| 2006/0144991 A1 * | 7/2006 | Frediani | ............... | 244/45 R |
| 2007/0018037 A1 * | 1/2007 | Perlo et al. | ............... | 244/45 R |
| 2008/0142641 A1 * | 6/2008 | Moore et al. | ............... | 244/215 |
| 2008/0245925 A1 * | 10/2008 | Udall | ............... | 244/52 |
| 2009/0084889 A1 * | 4/2009 | Cazals et al. | ............... | 244/12.1 |

FOREIGN PATENT DOCUMENTS

| | | |
|---|---|---|
| DE | 20111224 U1 | 3/2002 |
| EP | 1616786 A1 | 1/2006 |
| WO | 2004074093 A1 | 9/2004 |

* cited by examiner

*Primary Examiner* — Christopher P Ellis
(74) *Attorney, Agent, or Firm* — Perman & Green, LLP

(57) ABSTRACT

When an aircraft is propelled by at least one jet engine fixed in a rear part of the aircraft, at least one substantially horizontal rear aerodynamic surface, the rear horizontal surface, is arranged at the rear of the aircraft and at least one jet engine is fixed under the rear horizontal surface by an attachment mast fixed by its upper part to the rear horizontal surface and maintains, by its lower part, the jet engine. The rear horizontal surface is also the horizontal tail unit of the aircraft or a horizontal surface maintained above the fuselage. The rear surfaces and the fuselage are arranged such that the engines are installed and removed using a vertical movement of the engines, which are advantageously one, two or three in number, in the rear zone of the aircraft.

26 Claims, 11 Drawing Sheets

AIRCRAFT WITH JET ENGINES ARRANGED AT THE REAR

BACKGROUND

1. Field

The disclosed embodiments relate to the field of aircraft propelled by turbojet engines.

The disclosed embodiments more particularly relate to an aircraft architecture comprising one of more jet engines located in the rear part of the aircraft.

2. Brief Description

In transport aircraft propelled by jet engines the arrangement of the engines is variable in particular depending on the number of engines and in practice also on the size of these engines, size introducing important constraints.

When the number of jet engines is even, generally two or four jet engines, exceptionally six or eight, the jet engines are most often fixed under the wing of the aircraft, according to a symmetrical arrangement with respect to the axis of the aircraft. This arrangement is very common at present, on civil transport jet aircraft, because of its good performance in terms of the aerodynamic integration of the aircraft and despite the constraints it imposes on the undercarriages in order to maintain a sufficient ground clearance of the jet engines.

Another arrangement of the jet engines consists in fixing the jet engines on the rear part of the fuselage, symmetrically on each side. This arrangement gives rise to difficulties with regard to certification when two jet engines must be fixed on each side of the fuselage of an aircraft having four jet engines and generates difficulties in the management of the position of the center of gravity of the aircraft, in particular with large-sized jet engines like the modern jet engines with high bypass ratios. For these reasons, only aircraft of modest size having two jet engines using relatively small jet engines are at present designed with this system of mounting jet engines on the sides of the fuselage at the rear of the aircraft.

When the number of jet engines is odd, the extra engine with respect to the even number is generally placed in the axis of the aircraft, in the rear zone of the fuselage, and the even number of jet engines are arranged symmetrically as described before.

The examples of transport aircraft having three jet engines are rather limited and there can be mentioned in particular the DC10, comprising two jet engines fixed under the wing and a third jet engine fixed on the vertical stabilizer at the rear of the fuselage, the L1011 also comprising two jet engines fixed under the wing and a third jet engine fixed in the rear part of the fuselage, the B727 which comprises two jet engines fixed on the sides of the fuselage at the rear and a third jet engine fixed in the rear part in the axis of the fuselage.

These configurations with three jet engines, and in particular the arrangement of the third jet engine in the axis of the aircraft, present problems which explain why they are seldom used despite the advantage that the use of three engines can provide rather than two or four engines.

A first problem is related to the aerodynamic integration of such jet engines with the aircraft. In fact, the proximity with respect to the fuselage of these air intakes induces losses of aerodynamic loads and distortions of the flow speeds field that are prejudicial to good efficiency of the jet engine thus placed.

A second problem, also very critical for companies operating the aircraft, relates to the maintenance of these jet engines. Placed higher and less accessible than under-wing jet engines, they necessitate special means for the daily or periodic checking operations and their installation and removal operations are much more problematic than for jet engines suspended under a wing, which proves to be penalizing in operation. Moreover, their specific installation necessitates a special design of the nacelles, different for example from the jet engines fixed under the wings, and therefore different spare parts for the nacelles, different maintenance manuals and different training for maintenance personnel.

Whatever the number of jet engines and the arrangement of these jet engines on the aircraft may be, changes in regulations require increasingly lower noise levels for civil aircraft and the conventional configurations of jet engines fixed under the wing of the aircraft or at the rear of the fuselage present difficulties because of the noise which is radiated by the jet engines either forwards, fan noise at the air intake, or rearwards, jet noise. Various means are used at present at the level of the jet engine in order to reduce the radiated noise: acoustic treatment of the surfaces of the jet engine, elongation of the air intake, mixtures of primary and secondary flows of the jet, etc.

Although effective, these means however have limits because of the consequences they have on the efficiency of the jet engine and on its mass.

Another complementary method, known for reducing the noise radiated towards the ground and for limiting the disturbance of people living near airports, consists in using a part of the structures of the aircraft for creating a mask between the noise source of the jet engine and the ground. Solutions following this principle have been considered, such as for example fixing the jet engines above the wing or above the fuselage between two vertical stabilizers as proposed by the patent FR2873096. In this last example, the fuselage makes it possible to create a mask with respect to the noise radiated by the air intake and the fuselage: the horizontal stabilizer and the vertical stabilizers partly mask the jet noise in the downward and lateral directions.

However, in these various arrangements, the efficiency of the rear jet engine is affected and the maintenance problems remain high.

SUMMARY

The disclosed embodiments proposes favoring the installation of turbojet engines, in particular of turbojet engines of the modern generation with a high bypass ratio, at the rear of the aircraft by a mounting of the jet engines which makes it possible to retain conventional nacelles, of the type of the nacelles of jet engines mounted under the wing, in order to benefit from the aerodynamic and acoustic advantages of these nacelles and which allows an easy fitting and an easy maintenance of said turbojet engines.

This result is obtained with an aircraft propelled by at least one jet engine fixed in a rear part of the aircraft. The aircraft comprises a wing, at least one substantially horizontal rear aerodynamic surface, called the rear horizontal surface, situated at the rear of the aircraft and at least one jet engine fixed under the rear horizontal surface.

Advantageously, the jet engine is held by means of an attachment mast fixed by its upper part to the rear horizontal surface and which holds the jet engine by its lower part.

Advantageously, when the aircraft comprises a rear horizontal tail unit, this tail unit is also used as a rear horizontal surface for fixing at least one engine.

In a particular form, the rear horizontal tail unit is fixed on the fuselage, behind the wing, which makes it possible to arrange an engine on each side of the fuselage in a rear position with respect to the passenger zone of the fuselage and in a position separated from the fuselage for easy fitting and easy removal of the jet engines.

In another particular form the rear horizontal tail unit to which one or more engines are fixed is itself fixed, above the fuselage, to a vertical aerodynamic surface such as a vertical stabilizer which makes it possible to position the engines in a raised position in accordance with aerodynamic installation, acoustic and mechanical constraints. In a closely related form, a vertical tail unit comprising two vertical stabilizers fixed to the fuselage, preferably arranged in a V configuration, provides the holding of the horizontal tail unit to which the engines are fixed in order to obtain reinforced rigidity of the structure of the tail units.

Advantageously, when the aircraft comprises two engines fixed to the rear horizontal surface, these are arranged in a substantially symmetrical manner with respect to a vertical axial plane of the aircraft.

In order to improve the acoustic masking which limits the radiation of the noise towards the ground, the horizontal tail unit is advantageously equipped with end elements whose shapes and dimensions are also designed to improve the aerodynamic qualities of the tail units, the directional stability of the aircraft and its control about the vertical yaw axis.

In another embodiment, the aircraft comprises a rear aerodynamic surface, to which one or more engines are fixed, raised with respect to the fuselage, called the upper horizontal surface, maintained by at least two essentially vertical aerodynamic surfaces, called vertical surfaces, fixed substantially to the ends of said upper horizontal surface. In this arrangement the engines are placed between the vertical surfaces which form, with the fuselage, an improved acoustic mask.

In one example embodiment, the vertical surfaces are fixed to the fuselage of the aircraft, in particular when a single engine is fixed to the upper horizontal surface of a narrow fuselage or even when the fuselage is sufficiently wide, for example in the case of a flying wing, in order to arrange the vertical surfaces according to the number of engines to be fixed to the upper horizontal surface.

In another example embodiment, the vertical surfaces are fixed to a substantially horizontal lower aerodynamic surface, called the lower horizontal surface, fixed to the fuselage of the aircraft. Such an arrangement makes it possible to produce an acoustic mask with respect to the radiation of the engine or engines fixed under the upper horizontal surface substantially in all directions whilst favoring simplified fitting and removing operations for the jet engines. In particular by the choice of geometric shapes and arrangements of the lower horizontal surface, of the upper horizontal surface, of the vertical surfaces and of the attachment masts, it is possible, for an engine fixed to the upper horizontal surface, to carry out installation or removal operations by moving said engine with a vertical movement without there being any interference between said engine and structural elements of the aircraft.

Such a configuration is achieved in particular by using a lower horizontal surface comprising a leading edge with a concave shape in plan view and/or with forward-inclined vertical surfaces such that one end of the upper horizontal surface is forward with respect to an end of the lower horizontal surface.

When an engine is fixed to the upper horizontal surface in a zone situated vertically above the fuselage, the fuselage advantageously comprises non-structural parts suitable for allowing the installation or removal of such an engine by moving said engine with a vertical movement without there being any interference between said engine and structural parts of the aircraft.

In one embodiment, the fuselage comprises in its structural parts a well whose dimensions make it possible to move the engine using a vertical movement of said engine. Advantageously a wall of the well corresponds with a particular structural wall of the fuselage such as a sealed wall when said fuselage comprises a sealed rear end.

In another embodiment the engine is arranged with respect to the fuselage such that it is located above a non-structural tail cone which is fixed to the structural parts of the fuselage such that it can be moved to allow the engine to be moved with a vertical movement of said engine, for example a removable tail cone that can be separated from the structural part of the fuselage or a tail cone articulated on the structural part of the fuselage.

Thus the aircraft comprising an upper horizontal plane can receive, fixed to said upper horizontal plane, an engine substantially in the vertical axial plane of the aircraft and/or at least two engines arranged substantially symmetrically with respect to the vertical axial plane of the aircraft, in order to allow the installation at the rear of the aircraft of one, two or three engines, or even more, which benefit from the advantages procured by mounting under an upper horizontal plane.

Advantageously, when several engines are fixed to the upper horizontal surface, at last one of the engines is fixed in a position offset in a direction parallel with the longitudinal axis X of the aircraft such that explosions of parts of one engine does not risk damaging all of the other engines.

Advantageously, when at least two engines are fixed to the upper horizontal surface, at least one vertical surface is disposed between the upper horizontal surface and the lower horizontal surface, and/or between the upper horizontal surface and the fuselage, said vertical surface being situated between two engines fixed to the upper horizontal surface such that this vertical surface participates in the structural strength of the upper horizontal surface and provides protection of an engine with respect to possible projections of debris from an adjacent engine, for example by incorporating shielding.

The aircraft according to the disclosed embodiments comprising one or more rear engines comprises, if necessary, engines arranged in a conventional manner on another part of the aircraft, for example two engines fixed to the wing of the aircraft arranged substantially symmetrically with respect to the vertical axial plane of the aircraft.

BRIEF DESCRIPTION OF THE DRAWINGS

The description of the various embodiments are given with reference to the figures which show diagrammatic views of different arrangements of aircraft according to the disclosed embodiments:

FIG. 12b shows a detail, seen in partial tear-away, of the rear zone and illustrates the principle of the fitting and of the removal of the jet engines (shown with several positions);

DETAILED DESCRIPTION

Figure 1A:
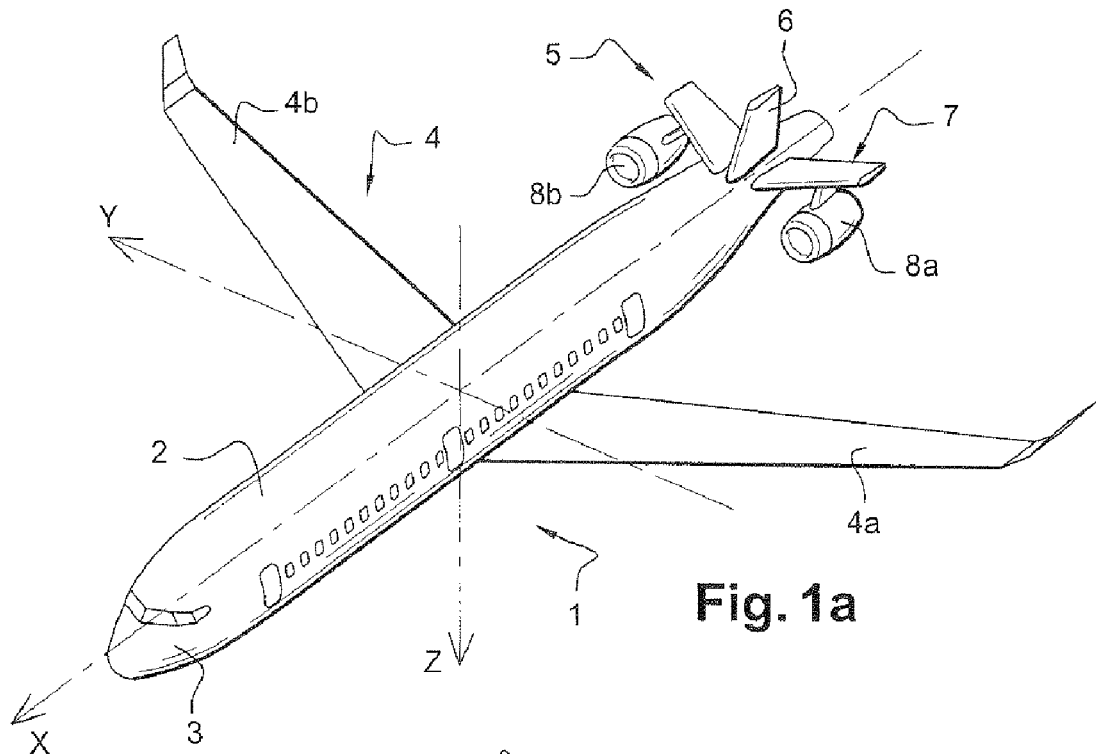
FIGS. 1*a* and 1*b*: an illustration of an aircraft having two jet engines where the jet engines are fixed under a rear horizontal tail unit fixed to the fuselage, FIG. 1*b* showing a detail of the rear zone of installation of the jet engines.
Figure 1B:
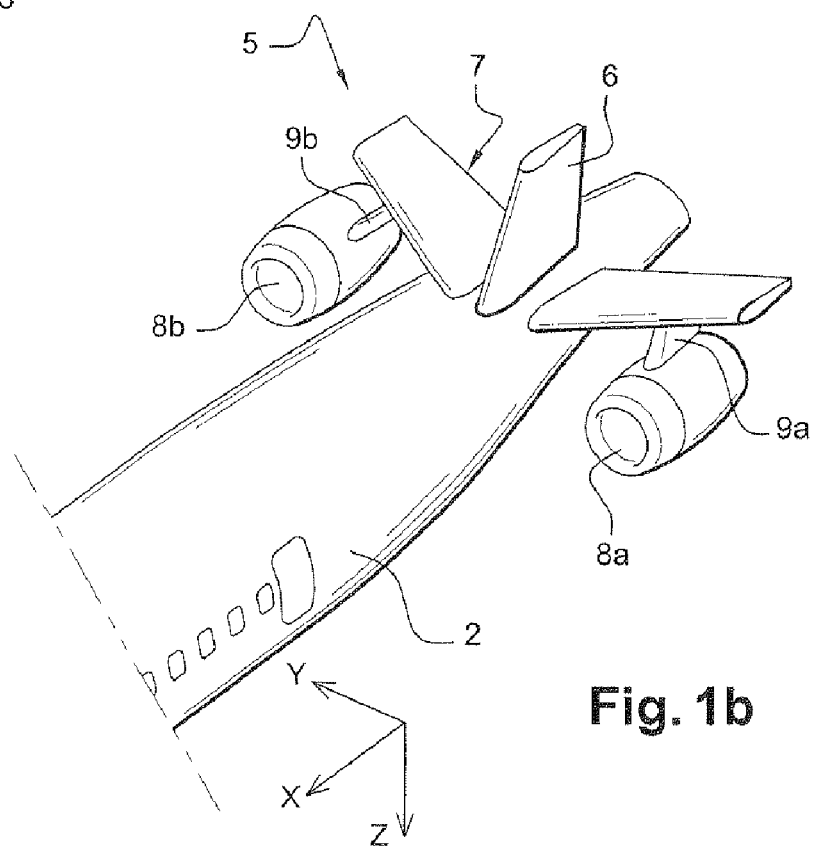

FIG. 1a and FIG. 1b show a first example of embodiment of an aircraft according to the disclosed embodiments comprising two jet engines.

The aircraft 1 in FIG. 1a has a conventional aerodynamic architecture for a modern transport aircraft. A fuselage 2 of substantially cylindrical shape, having a near-circular cross-section, of longitudinal axis X, called the roll axis, comprises a cockpit 3 at the front, in its central part a wing 4 whose two half-wings 4a, 4b extend on either side of the fuselage 2 substantially along a direction Y called the pitch axis, and at the rear an evolutive zone comprising an assembly of aerodynamic tail units 5. The tail unit 5, a detailed view of which is given in FIG. 1, comprises a substantially vertical stabilizer 6, along a Z axis called the yaw axis, and comprises a horizontal tail unit 7 that is symmetrical with respect to a vertical plane XZ passing through the axis of the fuselage 2, called the vertical axial plane, and fixed to the fuselage 2.

On the aircraft shown in FIGS. 1a and 1b, a jet engine 8 is fixed suspended under the horizontal tail unit 7 on each side of the vertical plane of symmetry of the aircraft 1, by the intermediary of an attachment mast 9a, 9b. The distance of said jet engines 8a, 8b from the vertical axial plane of the aircraft 1 is such that a jet engine remains distant from the walls of the fuselage 2 when it is lowered vertically towards the ground from its attached position under the horizontal tail unit 7. "Distant from the walls of the fuselage" should be understood to mean that the jet engine does not touch the fuselage, including taking account of the relative movements which can occur between the aircraft and the jet engine during a fitting or removing operation, when said jet engine is detached from the aircraft and moved substantially in a vertical direction (direction Z).

Moreover, the distance between the jet engine and the walls of the fuselage when the jet engine is fixed to the aircraft is sufficient for it to be possible, during maintenance operations, to open the cowls of the jet engine without risk of interference with the fuselage.

In the same way as when jet engines are suspended under the wing of an aircraft by means of attachment masts, said mast 9a, 9b comprises in its upper part means of attachment to the aircraft 1, that is to say under the horizontal tail unit 7, and comprises in its lower part means of attachment of the jet engine 8a, 8b. Such means, which are not shown, are known and most often comprise forks and rods intended for transmitting all of the forces (the weight of the jet engine, inertial forces, aerodynamic forces, thrust, etc.) between the jet engine and the structure of the aircraft. Moreover, also in a known way, the attachment masts are designed in order to allow the passage of all of the services (electrical, pneumatic, hydraulic, fuel, etc.) necessary for the jet engine and for the aircraft.

In the present case, the structure of the horizontal tail unit 7 is designed to withstand, in addition to the aerodynamic forces on the tail unit itself, the forces related to the presence of the jet engine attached to the tail unit.

The configuration of the aircraft shown in FIGS. 1a and 1b allows a rear mounting of the jet engines in which:

the jet engines are not directly connected to the fuselage, thus avoiding the transmission of vibrations prejudicial to the comfort of the cabin and not necessitating a reinforcement of the acoustic protection;

the jet engines are advantageously fixed further away from the fuselage than when they are fixed to the fuselage, a situation reducing the acoustic intensity at the wall of the fuselage;

each jet engine is substantially attached along its vertical plane of symmetry, as in the case of under-wing attachments, which results in a simplified attachment structure, which facilitates the operations of installation and removal of the jet engines and which allows the fitting of jet engine cowls that are downward opening and articulated close to the attachment mast having the effect of facilitating the checks and regular maintenance operations which are carried out on the ground or from a simple rising platform;

the position along the Z axis, that is to say the height of the jet engines 8a, 8b, is determined according to aerodynamic integration constraints by a choice of attachment mast 9a, 9b geometry without the constraint of taking up forces directly on the fuselage 2.

As already mentioned, the position of the jet engines in the Y direction is advantageously determined such that the cowls of each jet engine can be opened without risk of interference with the structure of the aircraft.

Moreover, the arrangement of the jet engines according to the disclosed embodiments makes it possible to use the structure of the attachment masts 9a, 9b for fixing lifting tools, for example hoists (not shown), in order to lower and raise the engine vertically during removal or fitting operations without it being necessary to use another lifting means.

These advantages are common to the various possible embodiments of the disclosed embodiments now described as non-limiting examples.

Figure 2:
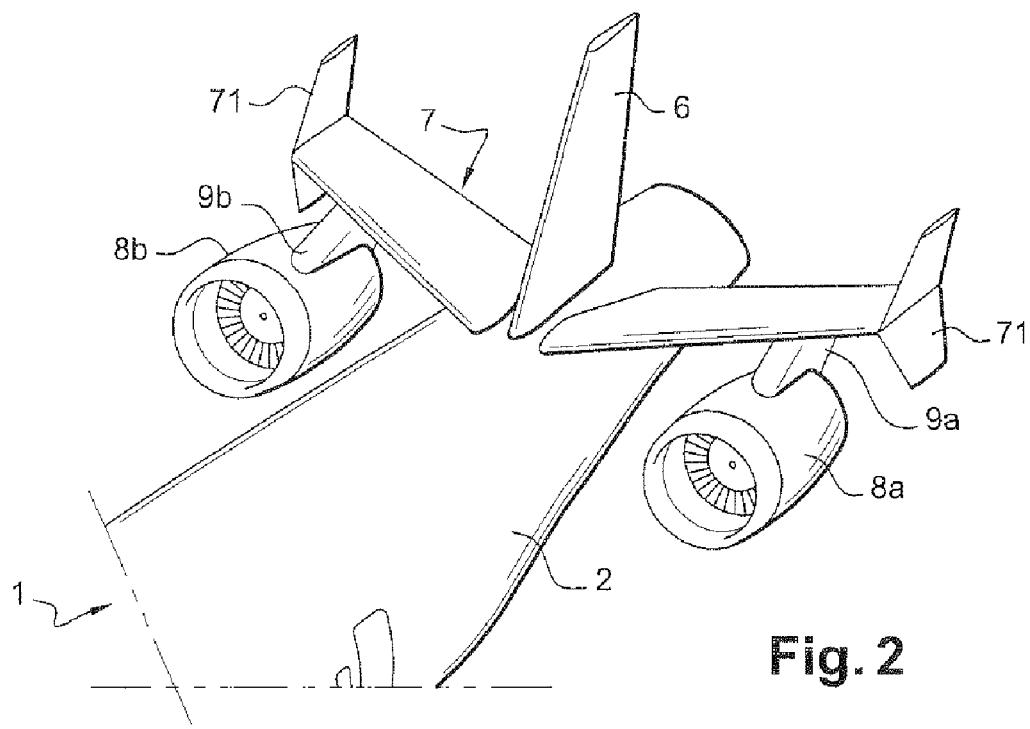
FIG. 2: a detail of the rear zone of an aircraft having two jet engines according to a variant of the arrangement shown in FIG. 1.

FIG. 2 shows the rear part of an aircraft according to a variant of the first example of embodiment close to that which has just been described and illustrated by FIG. 1.

In this example, end elements 71 are arranged on the horizontal tail unit 7. These elements 71, essentially vertical stabilizers, extend in a principal direction close to the vertical on one side, above or below, or on both sides, above and below, as in the case shown in FIG. 2, of the horizontal tail unit 7.

From the aerodynamic point of view, these end elements 71, whose effect is known, participate in the directional stability of the aircraft 1 (stability about the yaw axis Z) and in the present case are installed without necessitating significant reinforcement of the horizontal tail unit 7 whose structure is necessarily dimensioned to withstand the forces related to the installation of the jet engines 9a, 9b, and therefore without weight penalty. On the other hand, it is possible to reduce the size of the vertical stabilizer 6 situated in the axis of the fuselage 2, especially as the efficiency of this vertical stabilizer is generally reduced by the presence of the aerodynamic mask formed by the fuselage 2 when said fuselage has in certain flight phases of the aircraft a pitch-up incidence, which is not the case for the end elements 71.

Advantageously the end elements 71, which can be adapted to the other described embodiments of the disclosed embodiments, are also equipped with mobile trailing edge rudders in order to participate in the control of the aircraft 1 about the yaw axis.

Figure 3A:
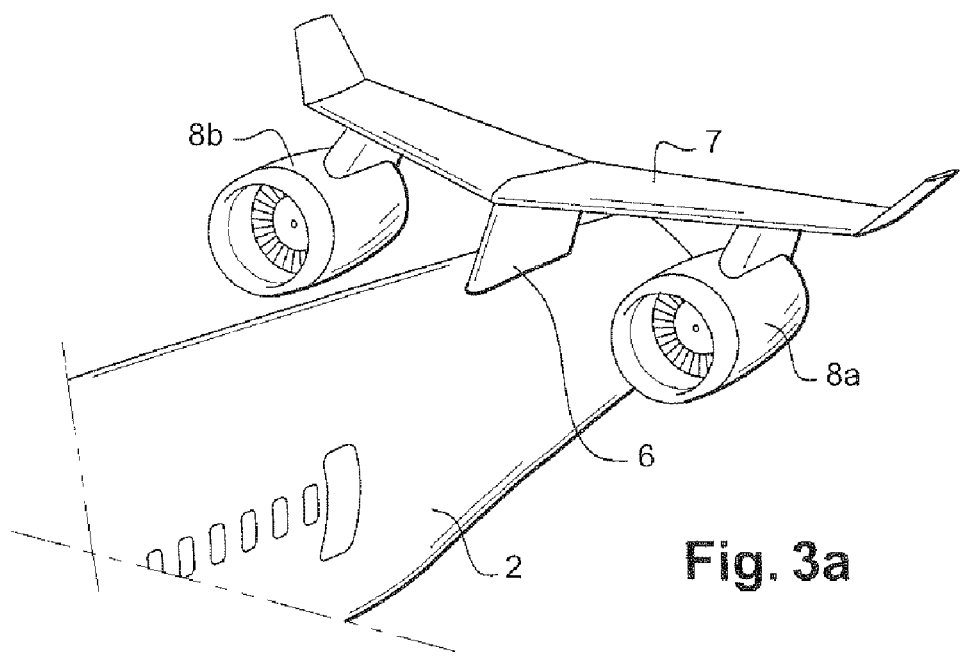
FIG. 3*a*: a detail of the rear zone of an aircraft having two jet engines according to a variant of the arrangement of FIG. 1 wherein the tail unit is fixed to a conventional axial vertical stabilizer.

FIG. 3a shows another variant of the first example embodiment of an aircraft having two jet engines, closely related to the examples of FIGS. 1 and 2.

In this example the jet engines 8a, 8b are arranged under the horizontal tail unit 7 as in the preceding examples but said horizontal tail unit is fixed to the vertical stabilizer 6 above the fuselage 2. Said horizontal tail unit is fixed to the upper end of the vertical stabilizer 6 as shown in FIG. 3a or is fixed at an intermediate height between the root of the vertical stabilizer 6, on the top of the fuselage, and its upper end (configuration not shown).

This raised configuration of the horizontal tail unit 7 makes it possible to easily adjust the height at which the jet engines are installed with respect to the axis of the fuselage 2 whilst retaining sufficient space between the jet engines 8a, 8b and the horizontal tail unit 7 in order to maintain satisfactory aerodynamic conditions in this zone.

When the rigidity conditions of the vertical stabilizer 6 for maintaining the horizontal tail unit 7 supporting the two jet engines 8a, 8b proves to be too penalizing to produce, in particular due to their impact on the mass of the aircraft, the single vertical stabilizer 6 is advantageously replaced by a double vertical stabilizer 6a, 6b, the two vertical stabilizers 6a, 6b preferably not being parallel, their planes forming an angle in order to form a so-called V configuration tail unit geometry. This double vertical stabilizer structure shown in FIG. 3b allows the structural assembly constituting the tail units 5 to have the necessary strength and rigidity with a reduced weight penalty.

Figure 4A:
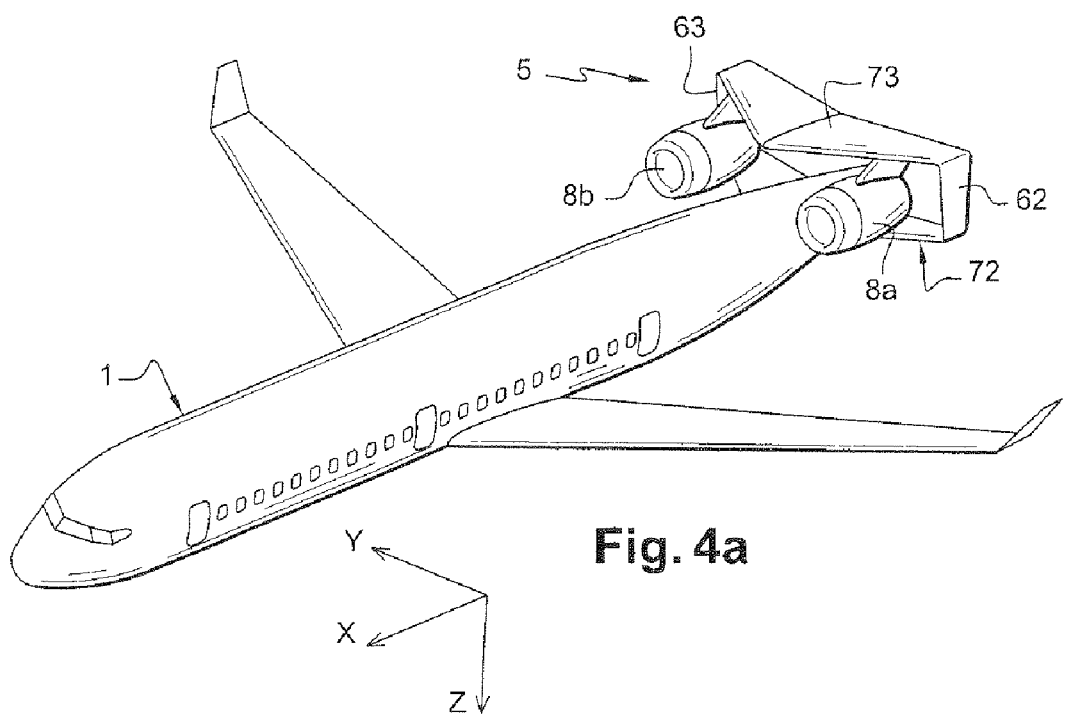
FIGS. 4a and 4b: an illustration of an aircraft having two jet engines with the jet engines fixed at the rear under a raised horizontal aerodynamic plane supported by its ends, FIG. 4b showing a detail of the rear zone of installation of the jet engines.

FIG. 4a shows a second example of embodiment of an aircraft having two jet engines according to the disclosed embodiments.

Figure 4B:
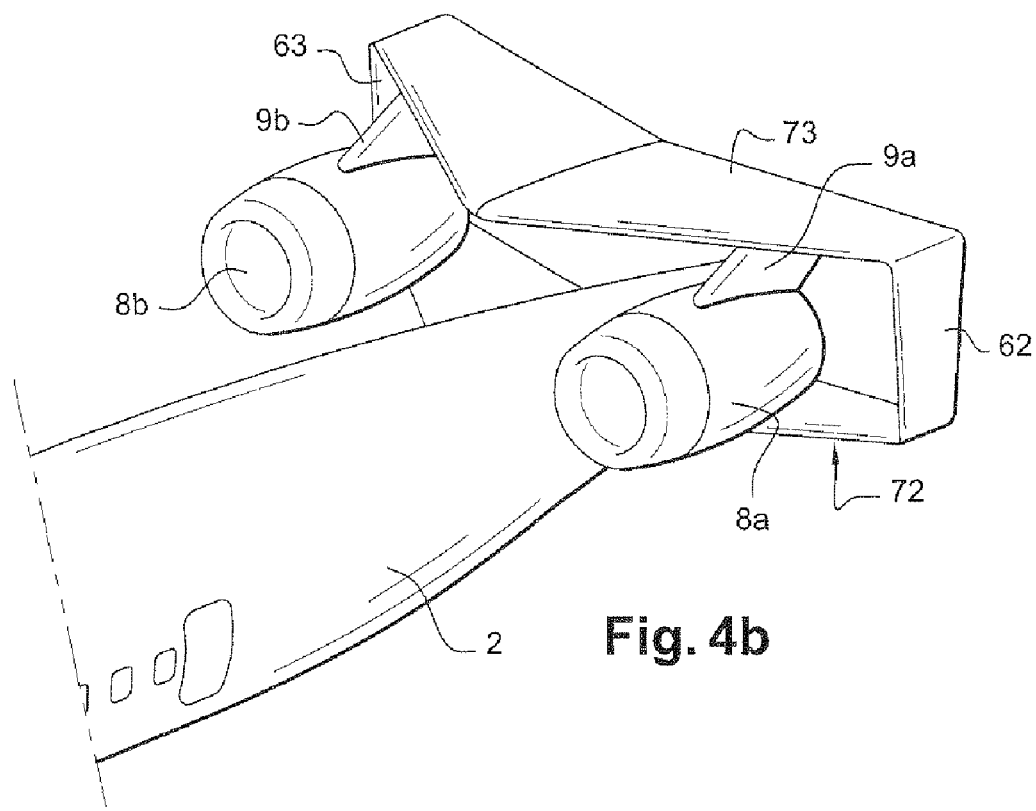

In this example the tail units 5 shown in FIG. 4b have a configuration which is modified in comparison with that of the preceding examples.

The tail units 5, a detailed view of which is given in FIG. 4b, comprise, on the one hand, two substantially horizontal aerodynamic surfaces 72, 73 which are offset in height along the Z axis. These two surfaces, called horizontal surfaces, 72, 73, jointly provide the function of a horizontal tail unit of the aircraft, one of said horizontal surfaces or both of them advantageously being provided with mobile trailing edge elevators in order to provide control about the pitch axis Y.

A first horizontal surface 72, called the lower horizontal surface, is fixed to the fuselage 2, advantageously in a conventional manner for a horizontal tail unit. The second horizontal surface 73, called the upper horizontal surface, is held spaced from the lower surface 72 by means of at least two substantially vertical aerodynamic surfaces 62 and 63. These two surfaces, called vertical surfaces 62, 63, jointly provide the function of a vertical tail unit and are advantageously provided with trailing edge rudders to provide control of the aircraft about the yaw axis Z.

Finally, the jet engines 8a, 8b are attached by means of attachment masts 9a, 9b under the upper surface 73, as in the case of the preceding example embodiment, under the horizontal tail unit.

This second configuration makes it possible to produce an aircraft 1 with the jet engines 8a, 8b at the rear, which makes it possible to obtain, with regard to the jet engines, the same advantages as with the configuration of the preceding example and which furthermore makes it possible:

to obtain a better decoupling of the jet engines with respect to the structure of the fuselage;

to have great design latitude in the choice of the height of installation of the jet engines;

to create a mask with respect to the jet noise both downwards by means of the lower surface 72 and to the sides by means of the vertical surfaces 62, 63, whilst retaining an attachment structure in which the jet engine is held by its upper part.

In order to retain the possibility of carrying out the operations of installation and removal of the jet engines 8a, 8b using an essentially vertical movement, the position of the jet engines 8a, 8b with respect to the structure of the lower horizontal surface 72 is sufficiently forward in the X direction.

The position of the jet engine with respect to the lower horizontal surface 72 is determined by the geometry:

of the lower horizontal surface 72 itself: by increasing the sweepback (the angle of the leading edge with respect to the direction of the Y axis) of the lower shape, the attachment point of the jet engines is moved back; by giving said surface a shape which is concave in plan view at the leading edge, more free space is given vertically with respect to the jet engine;

of the vertical surfaces 62, 63: a negative sweepback, that is to say a forward inclination in the plane of said surfaces, will have the effect of moving the jet engines forwards and more so if said surfaces are high and/or inclined;

of the upper horizontal surface 73; a positive sweepback of said surface which is fixed by its ends to the vertical surfaces 62, 63 will have the effect of moving the jet engines forwards;

of the attachment masts 9a, 9b whose length directly conditions the more or less forward position of the jet engines.

Figure 4C:
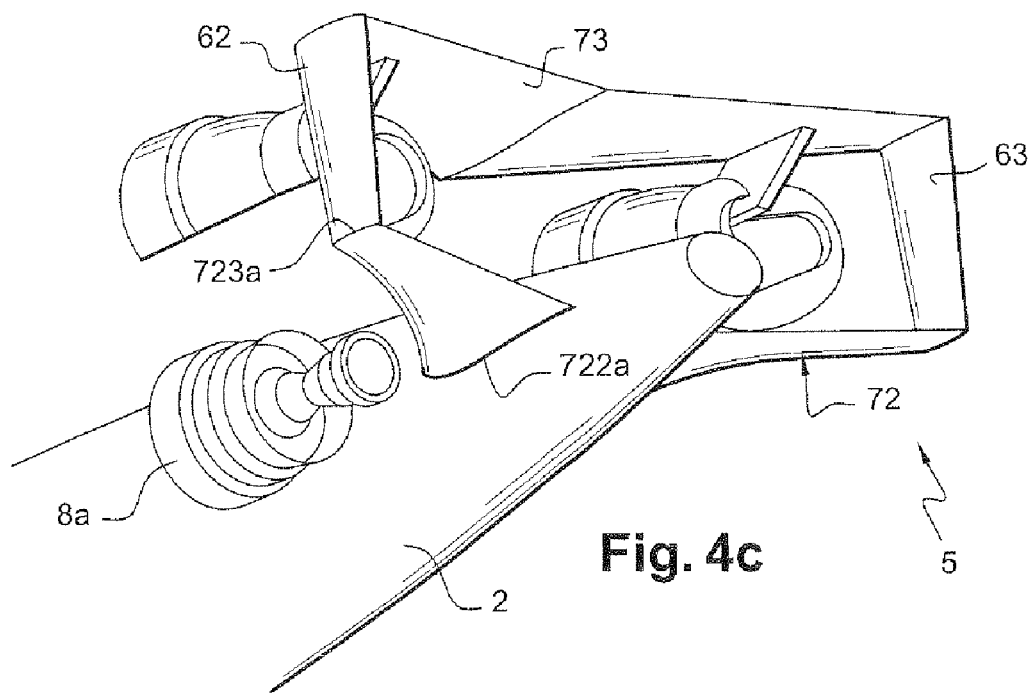
FIG. 4c: illustration of the removing of a jet engine according to the arrangement of FIG. 4.

FIG. 4c illustrates an intermediate position of a jet engine 8a during an operation of installation or of removal in which the configuration of the tail units 5 is adapted to avoid structural interference between the jet engine 8a, which follows a substantially vertical movement, and the structures of the aircraft. In this figure the engine handling tools have not been shown, but it is known that the installation of an engine, suspended under an aerodynamic surface, by an essentially vertical movement can be carried out with much simpler tools than in the other situations and that this operation is in this case carried out with substantially reduced risks of damaging the engine and/or the aircraft.

In this example, the shape in plan view of the lower horizontal surface 72 is concave at the leading edge 721, that is to say that a part of said leading edge situated between the root 722a and an end 723a of said horizontal surface is moved back in the aircraft's reference system with respect to a straight line connecting a point of the leading edge close to the root with a point of the leading edge close to the end of said horizontal surface.

The choice of a particular combination of parameters for positioning the jet engine under an aerodynamic surface depends on the aircraft and on the jet engine. It is dictated by considerations of the structure (strength, rigidity), of aerodynamics and of coupling between the two of them (aeroelasticity) known to aircraft designers.

Figure 5A:
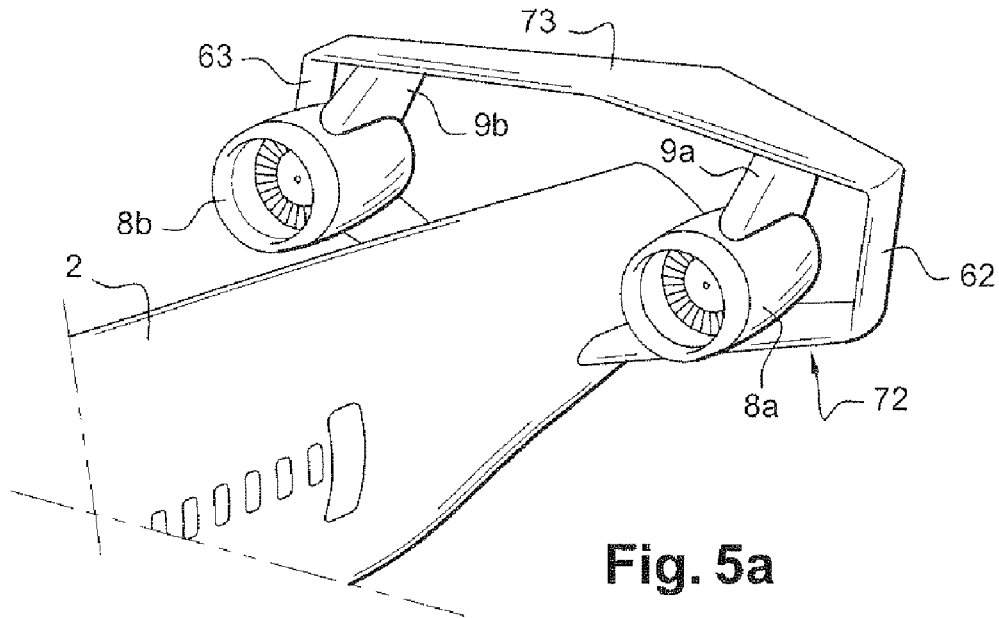
FIG. 5a: detail of the rear zone of an aircraft having two jet engines according to a variant of the arrangement shown in FIG. 4 in which the raised horizontal plane comprises a negative aerodynamic sweepback.

In a variant shown in FIG. 5a of this second example embodiment, the upper horizontal surface 73 is produced with a negative sweepback for better structural stability of this surface fixed by its ends. In this case, in order to make it possible to lower the jet engines substantially following a vertical path without interference with the structure of the aircraft, the lower horizontal surface 72 is designed with a reduced sweepback, or even zero sweepback, the vertical surfaces 62, 63 are inclined towards the front of the aircraft and the attachment masts 9a, 9b are adapted in length along the longitudinal direction.

Figure 5B:
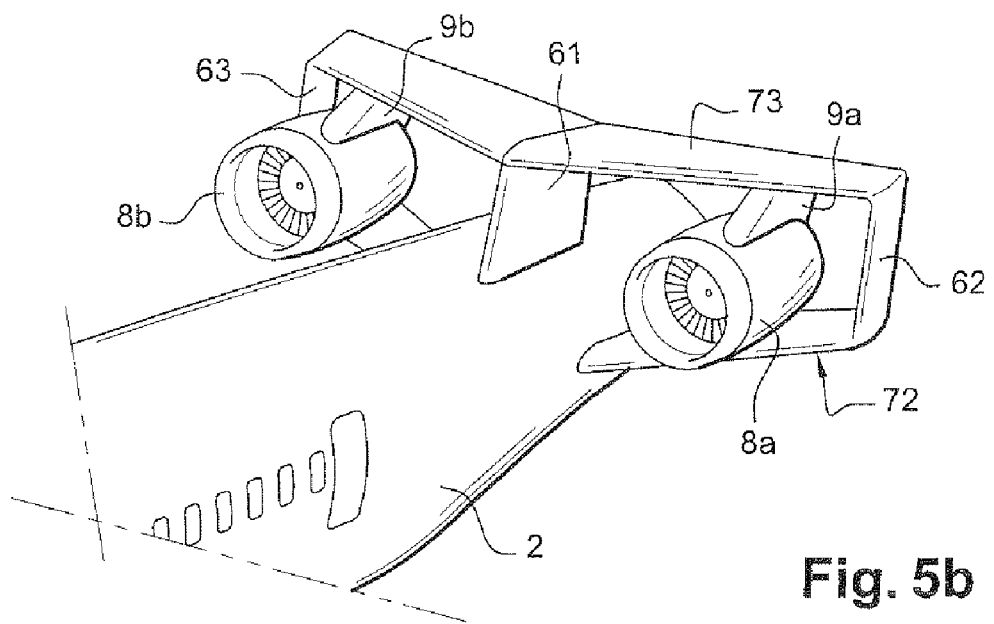
FIG. 5b: detail of the rear zone of an aircraft having two jet engines according to a variant of the arrangement shown in FIG. 4a wherein the raised horizontal plane is furthermore connected to the fuselage by a vertical stabilizer in the axis of the aircraft.

In another variant shown in FIG. 5b of this second example embodiment, an axial vertical aerodynamic surface 61, equivalent to a conventional vertical stabilizer, is associated with vertical surfaces 62 and 63. This axial vertical surface 61 is situated substantially in the axis of the fuselage and above the latter. Said axial vertical surface is fixed both to the fuselage 2 and to the upper surface 73. This axial vertical surface 61 participates, like the other vertical surfaces 62, 63, in the stability of the aircraft 1 about the yaw axis Z, and in its control about this axis when is it provided with a movable trailing edge surface.

This axial vertical surface 61 allows better holding of the upper surface and therefore a lightening of the structure of the upper surface 73, the lower surface 72 and the vertical surfaces 62, 63.

Another advantage of the axial vertical surface 61 is to provide protection of one of the jet engines 8a, 8b with respect to the other with regard to risks associated with explosion of rotary parts of said jet engines. This protection is, if necessary, reinforced by introducing means such as shielding materials in said axial vertical surface 61 in order to absorb the energy of projections.

The disclosed embodiments also apply when the aircraft comprises an odd number of jet engines, even though the installation and removal of a jet engine situated in the axial plane of symmetry of the aircraft can be affected.

In general, the aircraft configurations comprising an odd number of jet engines comprise one jet engine situated in the vertical axial plane of the aircraft, the other jet engines being distributed symmetrically with respect to said vertical axial plane.

The installation of a jet engine in the vertical axial plane of the aircraft, suspended under an aerodynamic surface situated above the fuselage by the intermediary of an attachment mast, proves achievable provided that the configuration of the aircraft 1 does not comprise any vertical aerodynamic surface in the plane of symmetry of the aircraft above the fuselage and that a horizontal surface is disposed above the fuselage at a height such that the aerodynamic channel between the horizontal surface and the top of the fuselage is sufficient, among other things for the installation and correct functioning of the jet engine.

Figure 3B:
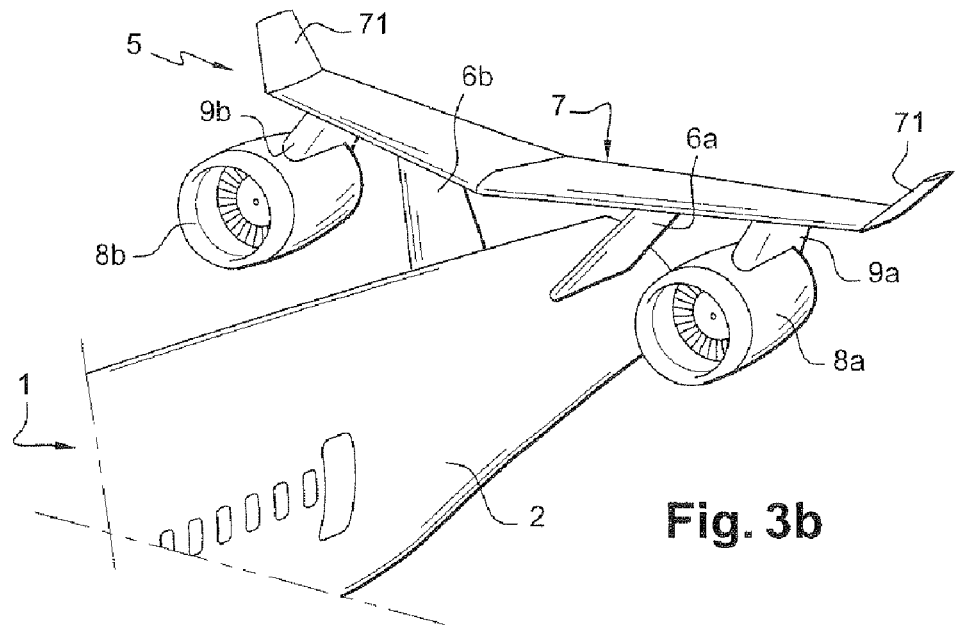
FIG. 3*b*: a detail of the rear zone of an aircraft having two jet engines according to a variant of the arrangement of FIG. 1 wherein the tail unit is fixed to a double vertical stabilizer having a V configuration.

Such a configuration is achievable with tail unit arrangements such as shown in the already described FIGS. 3b, 4a and 5a.

Figure 7:
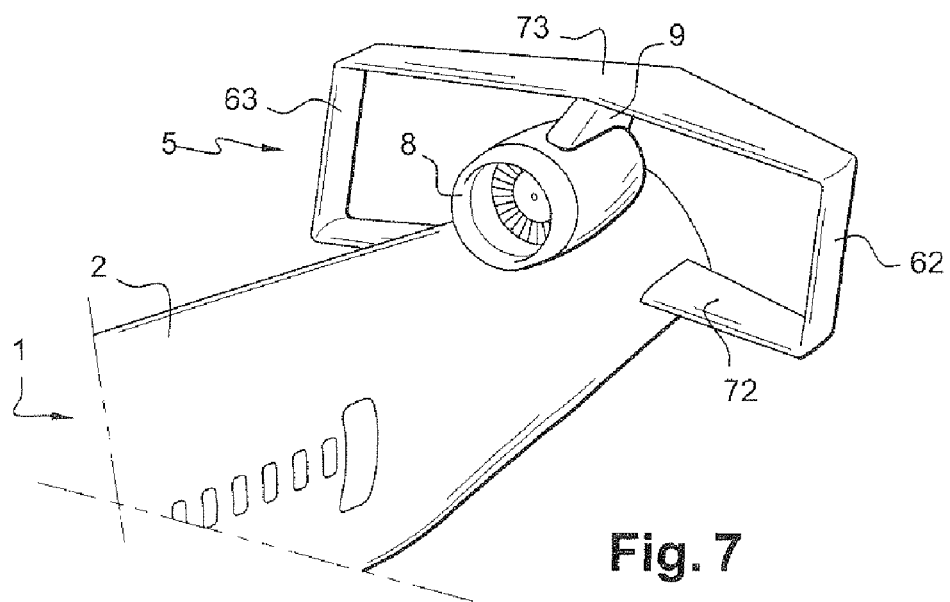
FIG. 7: detail of the rear zone of an aircraft comprising a raised horizontal plane with a reversed aerodynamic sweepback, as in the configuration shown in FIG. 5a, and a jet engine installed in the axis of the aircraft above the fuselage.

FIG. 7 shows a first example of installation of a jet engine 8 situated in the vertical axial plane at the rear of the aircraft 1.

In this example the tail units 5 have a configuration similar to those of FIGS. 4a and 5a described for an aircraft having two jet engines at the rear of the aircraft and the jet engine 8 is fixed in the same way by means of an attachment mast 9 but in the vertical axial plane of the aircraft 1.

In this example of installation, the jet engine 8 is placed above the fuselage 2, which improves the acoustic mask effect of the fuselage with respect to the ground both with respect to noise radiated by the air intake and to jet noise, but said jet engine cannot, without special precautions, be lowered vertically without mechanical interference with said fuselage.

Figure 8A:
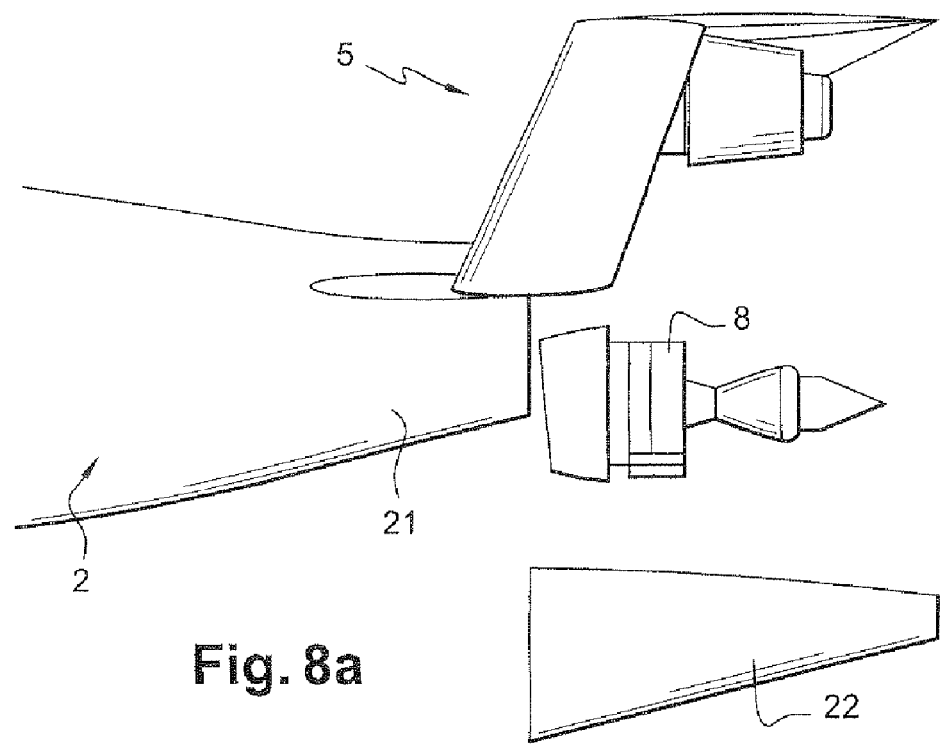
FIGS. 8a and 8b: examples of architectures of a rear zone of fuselage for ensuring the removal of a rear jet engine above the fuselage by removal of the tail cone (FIG. 8a) and by lateral rotation of the tail cone (FIG. 8b)
Figure 8B:
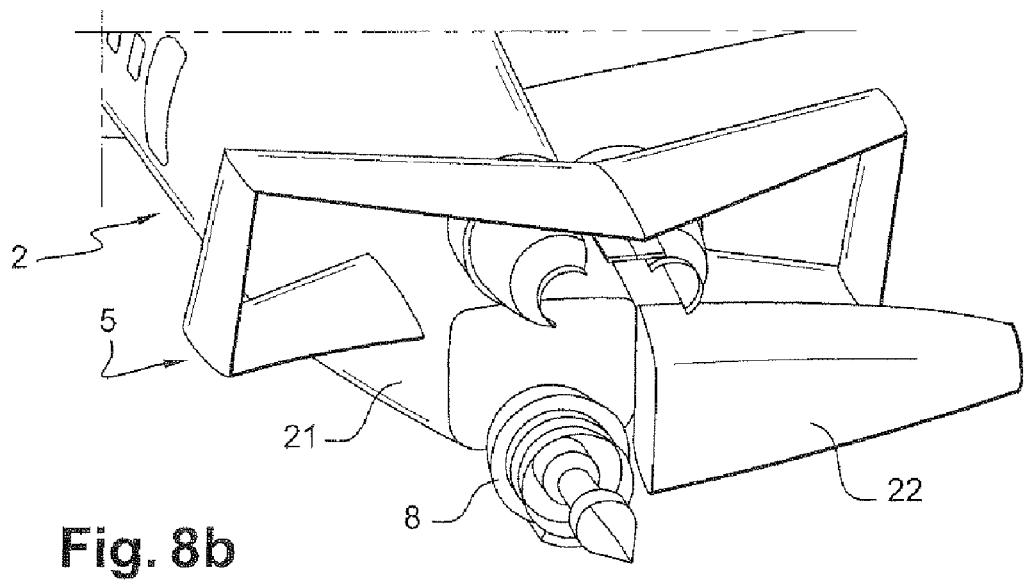

In order to allow the fitting and removal of the jet engine 8 using a substantially vertical movement, a first solution, illustrated in FIGS. 8a and 8b, consists in defining a tail unit configuration 5 such that the jet engine is placed sufficiently towards the rear above the fuselage 2 for the envelope of said jet engine to be situated along the X axis behind the structural parts 21 of the fuselage and above a non-structural zone 22, or rear cone, able to be removed without particular difficulty.

The rear cone 22 of modern aircraft is most often made from composite material which is both strong and light.

The rear cone 22 is removable as shown diagrammatically in FIG. 8a, which shows the rear jet engine 8 in an intermediate position of a fitting or removal operation of said jet engine. According to a different principle, the rear cone 22 is articulated on the structural parts 21 of the fuselage 2 as illustrated in FIG. 8b in order to allow a lateral movement of the rear cone 22 during operations of installation or of removal of the rear jet engine 8.

Figure 9:
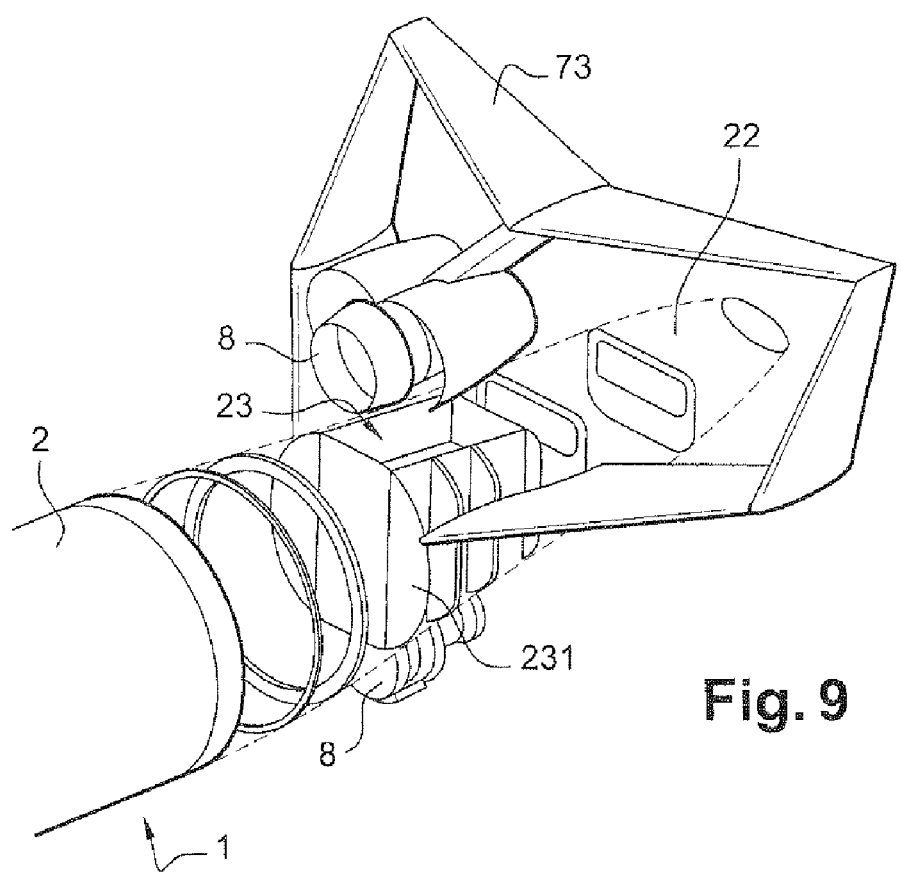
FIG. 9: example of an architecture of a rear zone of fuselage, seen in partial tear-away, for ensuring the removal of a rear jet engine (shown with several positions) above the fuselage by lowering through a well in the fuselage.

When the jet engine 8 is situated above a structural zone of the fuselage 2, in particular when it is not possible to move the jet engine sufficiently backwards for structural reasons or aerodynamic reasons or performance reasons, a solution illustrated in FIG. 9 consists in producing a well 23 in the structure of the fuselage 2.

The well 23 is produced with dimensions, length along the X axis and width along the Y axis, and in a position in the fuselage 2, which make it possible to lower the jet engine 8 substantially vertically through said well through the fuselage for operations of fitting and removal of the jet engine.

In an advantageous embodiment of the well 23, the front wall 231 of said well corresponds to the sealed rear end of the pressurized fuselage and/or the volume situated to the rear of the well in the rear cone 22 is used for the installation of systems of the aircraft such as an auxiliary power plant (not shown).

In normal operation of the aircraft 1, the upper and lower openings of the well 23 are closed by removable elements (not shown), for example panels made of composite material, which provide the aerodynamic continuity of the walls of the fuselage.

Figure 10:
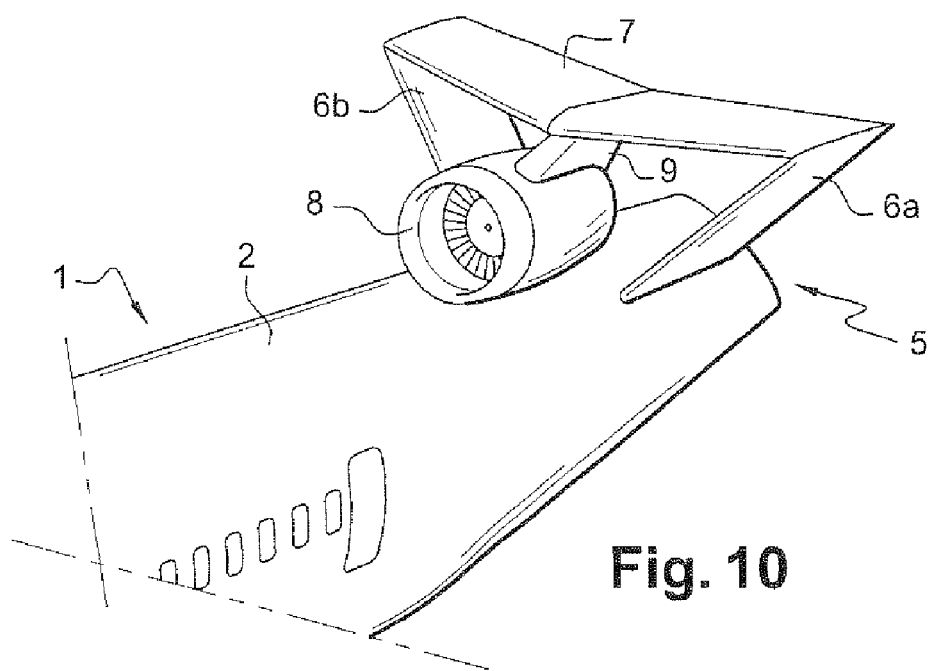
FIG. 10: detail of the rear zone of an aircraft comprising a horizontal plane raised by means of vertical stabilizers in V configuration fixed to the fuselage and a jet engine installed in the axis of the aircraft above the fuselage.

FIG. 10 illustrates a second example of installation of a jet engine 8 situated in the vertical axial plane at the rear of the aircraft 1.

This second example is similar to the preceding example with a configuration of the tail units 5 called a two vertical stabilizer configuration as described for the case of an installation of two jet engines at the rear of the aircraft illustrated in FIG. 3b.

In the case of a jet engine 8 situated in the vertical axial plane of the aircraft, said jet engine, fixed to the horizontal surface 7 by means of an attachment mast 9, is located between the vertical stabilizers 6a, 6b.

As shown in FIG. 10, the horizontal surface 7 is limited in span along the Y direction to between the zones at which it is fixed to the vertical stabilizers 6a, 6b.

Figure 6:
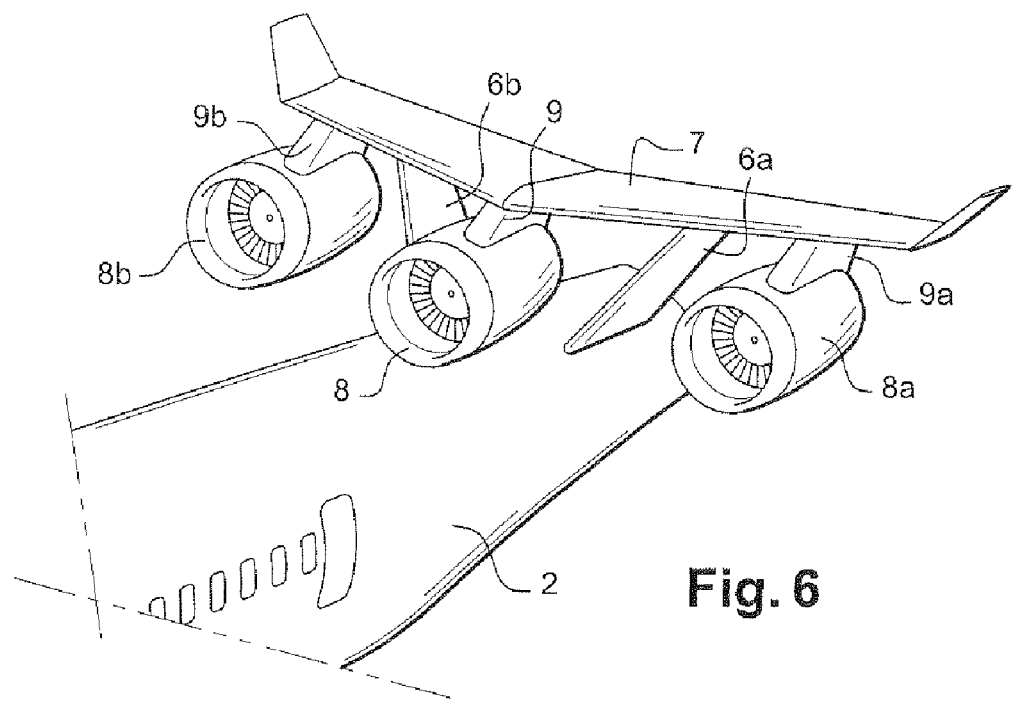
FIG. 6: detail of the rear zone of an aircraft comprising three jet engines at the rear according to a variant of the arrangement shown in FIG. 3b wherein a third jet engine is mounted in the plane of symmetry of the aircraft.

In another closely related embodiment (not shown) the horizontal surface 7 extends in span along the Y direction beyond the zones at which it is fixed to the vertical stabilizers 6a, 6b as in the configurations illustrated in FIG. 3a or in FIG. 6.

The solutions shown for making it possible to carry out the fitting or the removal of the jet engine 8 situated in the vertical plane of symmetry of the aircraft, behind or through the fuselage, are also applicable to this example of embodiment.

Figure 11:
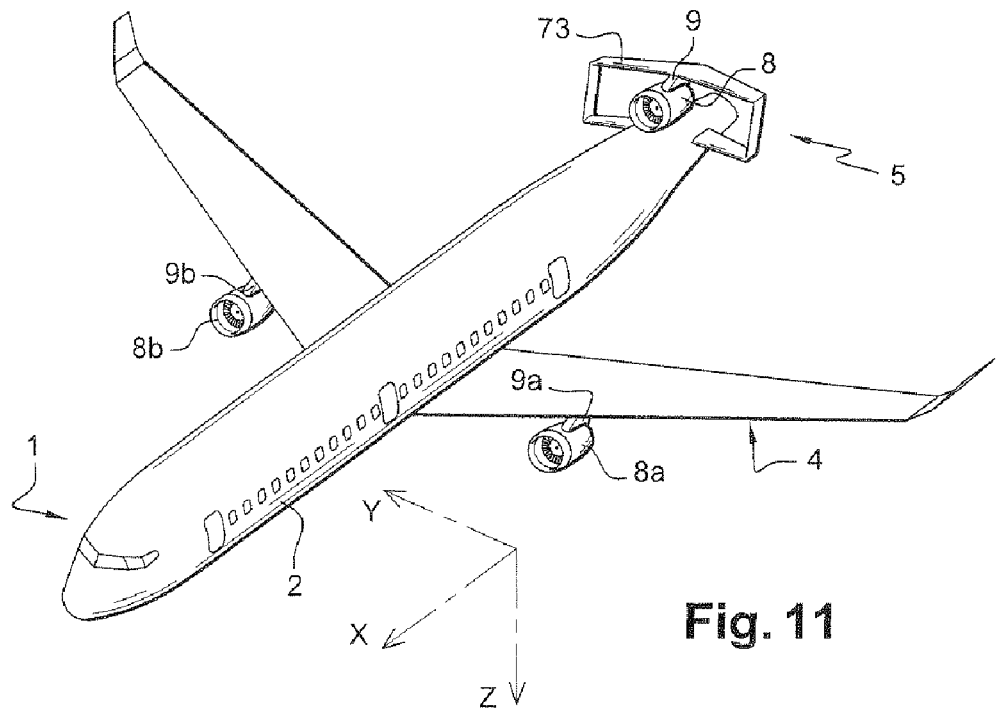
FIG. 11: illustration of an aircraft with three jet engines comprising a jet engine fixed at the rear in the axis of the fuselage under a raised horizontal plane and above the fuselage and comprising two jet engines mounted symmetrically under the wing of the aircraft.

FIG. 11 shows a first example of embodiment of an aircraft 1 comprising an odd number of jet engines, three jet engines in the figure, of which one jet engine 8 is installed at the rear of the fuselage according to an example of embodiment described previously when a jet engine is installed in the vertical axial plane of the aircraft 1.

In this example, which is based, by way of illustration, on the configuration of tail units 5 shown in FIG. 7, only the jet engine 8 situated in the vertical axial plane of the aircraft 1 is situated at the rear of the aircraft as described previously and the other two jet engines 8a, 8b are fixed conventionally under the wing 4, symmetrically with respect to the fuselage 2.

In this configuration, the jet engines 8a, 8b fixed under the wing 4 do not benefit from the acoustic mask effects procured for the rear jet engine 8 by the fuselage 2 and the tail units 5, but the use of three jet engines instead of two makes it possible to reduce, for a given aircraft, the unit power of the jet engines and therefore their acoustic emission level.

Advantageously, the three jet engines 8, 8a, 8b, including the nacelles and the thrust reversal systems which generally equip these jet engines, are identical or have at least a large degree of commonality of the associated means.

Advantageously, the three jet engines are also attached to the structures of the aircraft 1, wing 4 or rear upper horizontal surface 73, by means of attachment masts 9, 9a, 9b that are identical or that differ only in secondary elements.

Thus, the jet engines and the attachment masts can be interchangeable at low cost, which allows the operator of the aircraft not to increase his stock of spare parts significantly.

Figure 12A:
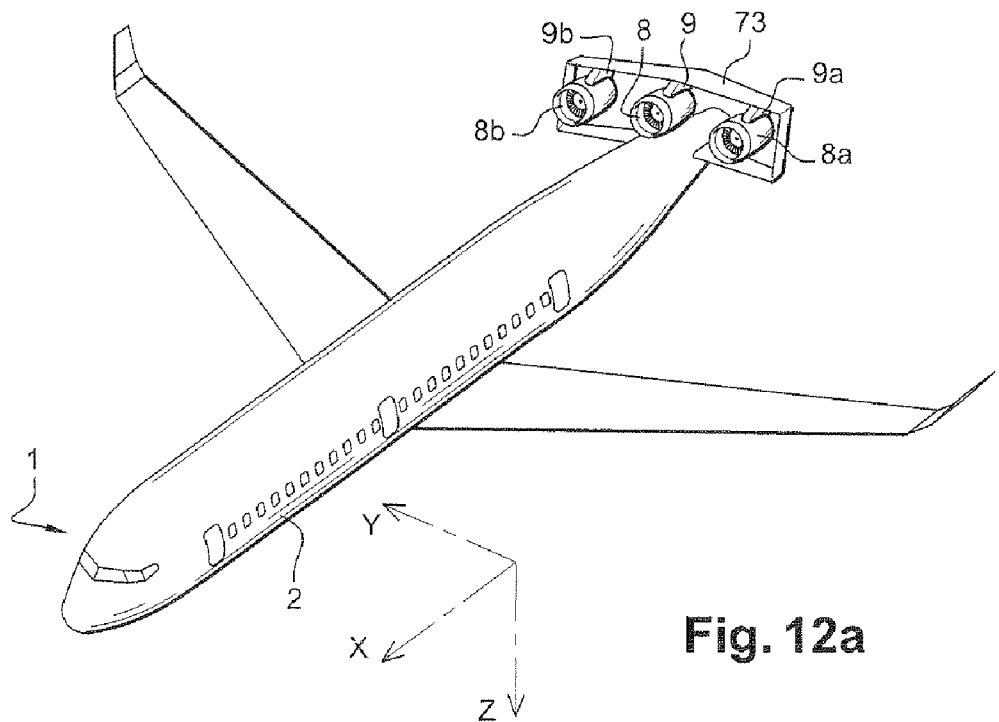
FIGS. 12a and 12b: illustration of an aircraft having three jet engines comprising a raised horizontal plane under which is fixed a first jet engine in the axis and above the fuselage and under which are fixed two other jet engines mounted symmetrically on each side of the first jet engine.

FIG. 12a shows a second example of embodiment of an aircraft 1 comprising three jet engines 8, 8a, 8b, installed at the rear of the fuselage 2 according to an example embodiment described previously when a jet engine 8 is installed in the vertical axial plane of the aircraft 1.

In this example, which is based, by way of illustration, on the configuration of tail units 5 shown in FIG. 4a illustrating a configuration of an aircraft having jet engines at the rear, the three jet engines are fixed under the rear upper horizontal surface 73 by means of attachment masts. The jet engine 8 is situated in the vertical axial plane of the aircraft 1 and the other two jet engines 8a, 8b are fixed in a substantially symmetrical manner with respect to said vertical axial plane, preferably with sufficient spacing between the jet engines to allow the opening of cowls without risk of interference.

Advantageously, in this configuration of an aircraft having three jet engines at the rear, the sweepback of the upper horizontal surface 73 and the fixing points, on said upper horizontal surface, of the attachment masts 9, 9a, 9b of the jet engines 8, 8a, 8b are chosen so that at least one jet engine, a priori the jet engine 8 in the vertical axial plane, is offset in the longitudinal direction X such that the consequences of an explosion of one of the jet engines are limited.

Figure 12B:
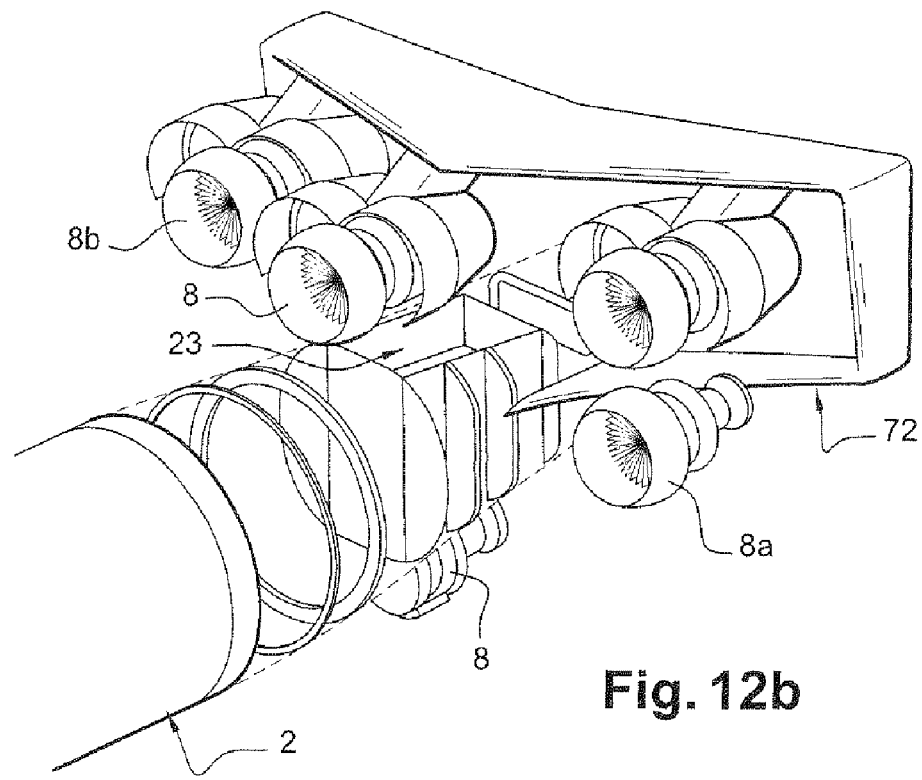

Advantageously, as illustrated in FIG. 12b, the attachment positions of the outer jet engines 8a, 8b with respect to the structures of the fuselage 2 and the lower horizontal surface 72, allow the operations of fitting and of removing of said outer jet engines by a substantially vertical movement of the jet engines, as described above for an aircraft having two jet engines at the rear, and the position of the jet engine 8 situated in the vertical axial plane is associated, according to the case, with a rear cone of the aircraft 1 able to be moved or with a well 23 as described above for the case of a rear jet engine 8 positioned in the vertical axial plane.

A variant of this configuration comprising three jet engines is shown in FIG. 6.

The upper horizontal surface 7 in this configuration is held above the fuselage by vertical stabilizers 6a, 6b arranged in a V configuration as in the case of the configuration shown in FIG. 3b.

The upper horizontal surface 7 extends in span along the Y direction beyond the points at which said surface is fixed to the vertical stabilizers 6a, 6b and a jet engine 8 is fixed between said vertical stabilizers, above the fuselage 2, and two engines 8a, 8b are fixed outside of said vertical stabilizers, one on each side.

Figure 13A:
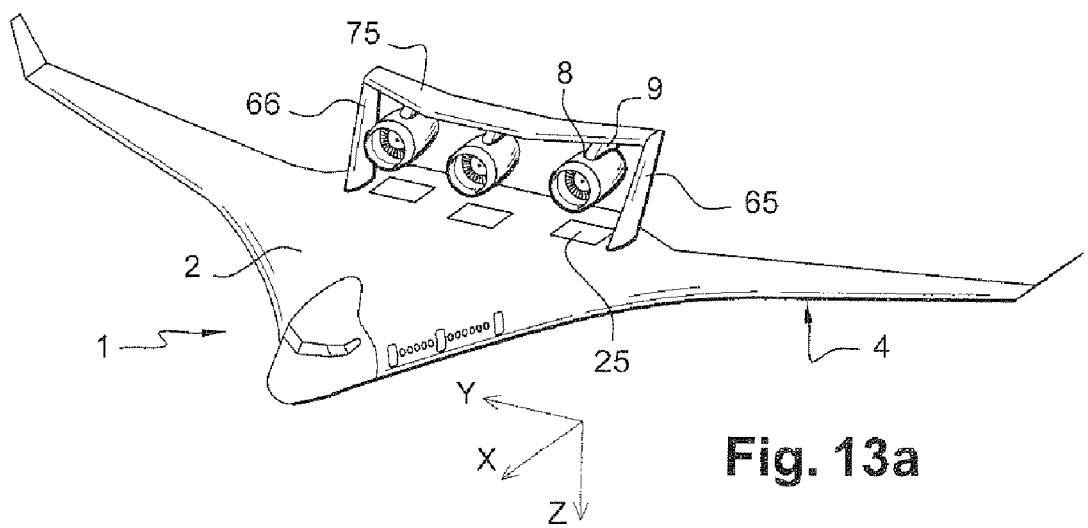
FIGS. 13a and 13b: illustration of a flying wing comprising three jet engines fixed in the rear part of the fuselage under a raised horizontal plane and above the fuselage without a vertical surface between the engines (FIG. 13a) or with vertical surfaces between the engines (FIG. 13b).
Figure 13B:
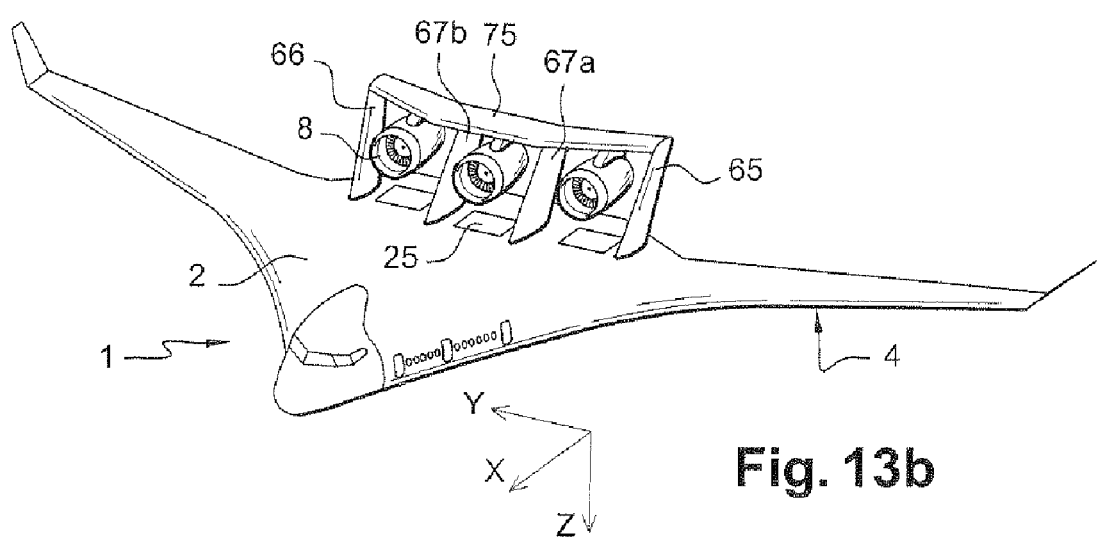

FIGS. 13a and 13b shown another example of embodiment of an aircraft comprising, by way of illustration, three jet engines.

In this example, the aircraft 1 is of the flying wing type, that is to say it does not have any distinct separation between the fuselage 2 and the wing 4 as in the configurations generally encountered at present on civil transport aircraft.

Flying wings have the advantage of being able to provide very large loading volumes both in terms of the number of passengers and in terms of freight but, on the other hand, the installation of jet engines in a manner not penalizing the loading capacities or the operational capabilities of the aircraft remains a problem.

According to the disclosed embodiments, a substantially horizontal aerodynamic surface 75 is held in the rear part of the aircraft 1 above the fuselage zone 2 of the flying wing by means of at least two substantially vertical aerodynamic surfaces 65, 66.

As already described in the preceding examples of embodiment, jet engines 8 are attached under the horizontal surfaces 75 by means of attachment masts 9 and advantageously all of the jet engines do not have the same position along the X axis because of consequences that the explosion of a jet engine could have on the other jet engines.

Most of the features of the tail units of the other examples described apply to the upper 75 and vertical 65, 66 aerodynamic surfaces appropriate for this embodiment.

In particular, it is advantageous, as shown in FIG. 13*b*, to produce a substantially vertical aerodynamic surface 67*a*, 67*b* between each jet engine. These vertical aerodynamic surfaces make it possible to produce a horizontal surface for supporting the jet engines 8 and having reinforced strength and rigidity and making it possible to install shielding for protecting against the projections of debris between the jet engines.

This configuration makes it possible to form, by means of the fuselage and the vertical surfaces, an acoustic mask of good quality which participates in the reduction of noise radiated towards the ground.

Advantageously, the part of the fuselage situated under the jet engines comprises wells 25 for the operations of installation and removal of the jet engines.

Thus, the proposed disclosed embodiments makes it possible to produce aircraft configurations comprising one or more jet engines situated in the rear part of the aircraft such that the rear jet engine or jet engines are fixed under a structure, suspended by attachment masts, and that said jet engines can be installed or removed by a vertical movement of the jet engine without interference with the structures of the aircraft.

The invention claimed is:

1. An aircraft comprising:
   a fuselage having front and rear portions;
   a wing connected to the fuselage; and
   a rear tail unit situated behind the wing at the rear of the aircraft, said rear tail unit having at least one horizontal stablilizer;
   at least one jet engine fixed to the at least one horizontal stabilizer of the rear tail unit and located under the horizontal stabilizer by means of an attachment mast disposed between the horizontal stabilizer and the at least one jet engine; said attachment mast and said horizontal stabilizer being arranged such that said at least one engine hangs vertically adjacent to said fuselage and substantially proximal to the ground, or hangs vertically above a non structural part of said fuselage and substantially proximal to the top to the fuselage, thereby allowing easy installation and/or removal of said engine.

2. The aircraft according to claim 1, wherein the at least one horizontal stabilizer is fixed to the fuselage.

3. The aircraft according to claim 1, wherein the rear tail unit further comprises a vertical stabilizer and wherein the at least one horizontal stabilizer is fixed to said vertical stabilizer above the fuselage.

4. The aircraft according to claim 1, wherein the vertical stabilizer further comprises two substantially vertical aerodynamic surfaces, and wherein the at least one horizontal stabilizer is fixed to said vertical aerodynamic surfaces above the fuselage and extends laterally beyond said vertical aerodynamic surfaces.

5. The aircraft according to claim 4, wherein the two substantially vertical aerodynamic surfaces form an angle.

6. The aircraft according to claim 4, comprising at least two jet engines fixed to the at least one horizontal stabilizer arranged symmetrically with respect to a vertical axial plane of the aircraft.

7. The aircraft according to claim 1, wherein the at least one horizontal stabilizer comprises end elements forming essentially vertical aerodynamic surfaces extending vertically above and/or below the horizontal stabliizer.

8. The aircraft according to claim 1, wherein the at least one horizontal stabilizer comprises an upper horizontal aerodynamic surface that is raised with respect to the fuselage by at least two substantially vertical aerodynamic surfaces fixed to the ends of said upper horizontal aerodynamic surface.

9. The aircraft according to claim 8, wherein the vertical aerodynamic surfaces are fixed to the fuselage of the aircraft.

10. The aircraft according to claim 8, wherein the at least one horizontal stabilizer further comprises a lower horizontal aerodynamic surface fixed to the fuselage of the aircraft and the vertical aerodynamic surfaces are fixed between the lower horizontal aerodynamic surface and the upper horizontal aerodynamic surface.

11. Aircraft according to claim 10, characterized in that the geometric shapes and the arrangements of the lower horizontal surface (72), of the upper horizontal surface (73), of the vertical surfaces (62, 63), of the rear horizontal tail unit, and of the attachment masts (9*a*, 9*b*) allow, for at least one engine (8*a*, 8*b*) fixed to the upper horizontal surface (73) of the rear horizontal tail unit, the installation and/or the removal by moving said engine with a vertical movement without there being any interference between said engine and structural elements of the aircraft (1).

12. Aircraft according to claim 11, characterized in that the lower horizontal surface (72) of the rear horizontal tail unit comprises a leading edge (721) with a concave shape in plan view.

13. Aircraft according to claim 11, characterized in that the vertical surfaces (62, 63) are inclined forwards such that one end of the upper horizontal surface (73) of the rear horizontal tail unit is forward with respect to an end of the lower horizontal surface (72) of the rear horizontal tail unit.

14. Aircraft according to claim 8, characterized in that the fuselage (2) comprises non-structural parts (22, 23) able to allow, for at least one engine (8), the installation or the removal of said engine by moving said engine with a vertical movement without there being any interference between said engine and structural parts (21) of the aircraft (1).

15. Aircraft according to claim 14, characterized in that the fuselage (2) comprises in its structural parts (21), a well (23, 25) whose dimensions make it possible to move the engine (8) with a vertical movement of said engine.

16. Aircraft according to claim 15, characterized in that a wall (231) of the well (23) corresponds to a sealed wall of the fuselage (2) when said fuselage comprises a sealed rear end.

17. Aircraft according to claim 14, characterized in that the fuselage (2) comprises a tail cone (22) that can be moved to make it possible to move the engine (8) with a vertical movement of said engine.

18. Aircraft according to claim 17, characterized in that the tail cone (22) is removable, in order to be separated from the structural part (21) of the fuselage (2).

19. Aircraft according to claim 17, characterized in that the tail cone (22) is articulated on the structural part (21) of the fuselage (2).

20. The aircraft according to claim 8, wherein the at least one engine is fixed to the upper horizontal aerodynamic surface of the horizontal stabilizer in the vertical axial plane of the aircraft.

21. The aircraft according to claim 8, further comprising at least two engines fixed to the upper horizontal aerodynamic surface of the horizontal stabilizer and arranged symmetrically with respect to the vertical axial plane of the aircraft.

22. The aircraft according to claim 21, further comprising an engine fixed to the upper horizontal aerodynamic surface substantially in the vertical axial plane of the aircraft.

23. The aircraft according to claim 20, wherein the engine is in a position offset in a direction parallel to the longitudinal axis of the aircraft.

24. The aircraft according to claim 8, further comprising at least one additional vertical surface between the upper horizontal aerodynamic surface and the substantially horizontal lower surface and/or between the upper horizontal aerodynamic surface and the fuselage, said at least one additional vertical surface being situated between two engines fixed to the upper horizontal aerodynamic surface.

25. The aircraft according to claim 24, wherein the at least one additional vertical surface comprises means of shielding against projections of engine debris.

26. The aircraft according to claim 1, further comprising at least two engines fixed to the wing of the aircraft and arranged substantially symmetrically with respect to a vertical axial plane of the aircraft.

* * * * *

UNITED STATES PATENT AND TRADEMARK OFFICE
CERTIFICATE OF CORRECTION

| | | |
|---|---|---|
| PATENT NO. | : 8,128,023 B2 | Page 1 of 1 |
| APPLICATION NO. | : 11/946579 | |
| DATED | : March 6, 2012 | |
| INVENTOR(S) | : Olivier Cazals | |

It is certified that error appears in the above-identified patent and that said Letters Patent is hereby corrected as shown below:

Page 16, Column 13, Claim 1, line 32 delete "stablilizer" and insert -- stabilizer --, therefor.

Page 16, Column 13, Claim 7, line 65 delete "stabliizer" and insert -- stabilizer --, therefor.

Signed and Sealed this
Twenty-ninth Day of May, 2012

David J. Kappos
*Director of the United States Patent and Trademark Office*